United States Patent Office.

FRANCIS FRISIANI, OF NEW YORK, N. Y.

Letters Patent No. 93,982, dated August 24, 1869

IMPROVED MEDICAL COMPOUND FOR TREATING THE ORGANS OF VOICE.

The Schedule referred to in these Letters Patent and making part of the same.

*To all whom it may concern:*

Be it known that I, FRANCIS FRISIANI, of the city, county, and State of New York, doctor of medicine, have invented a new and useful medical preparation, which I call Vocalina; and I do hereby declare the following to be a full and correct description of the same.

The invention consists in the preparation of a medicine, applicable to the treatment of affections of the vocal organs, from a resin of a peculiar character, found in the central parts of South America, and which possesses a remarkable tendency to afford relief in acute affections of the fauces and vocal cords, and in other analogous diseases.

It is intended to be used as a gargle, but should any portion of it pass to the stomach, no evil effect would result.

The best quality of the resin which I use in the preparation of the vocalina is found in the province of Matto Grosso, in Brazil, where it is called by the natives, jatoba. The tree which produces it belongs to the family of leguminosæ, called by naturalists *Hymenea abati timbaby*, *Hymenea jatahy*, or *Hymenea martiana*. The resin is gathered in September and October, at which season it drops from the tree. In color and external appearance it very nearly resembles the gum-copal, but is quite different in its chemical character, not dissolving in cold alcohol, as copal does, and being also insoluble in turpentine, which easily dissolves copal.

The method of preparation is as follows:

The resin is first powdered, and then put in a mattrass with absolute alcohol of 40° Baumé, in the proportion of one drachm of the pulverized resin to one ounce of alcohol. Heat is applied by a water-bath, and the resin is dissolved, forming the solution which is the basis of the vocalina. The solution is complete when, by dropping a drachm of it in two ounces of water, there results a liquid of a milky color, without the least precipitate. To the solution thus prepared, I add a small quantity (the proportion is immaterial) of the tinctures of kino, rhatany, and sassafras, and a double dose of alcohol. The tinctures must be dissolved in pure alcohol (absolute) before being added to the dissolved resin, otherwise they would not unite with it. They are added for the purpose of disguising the taste and smell of the resin, and making it more agreeable to the palate.

A gargle is formed from the mixture prepared as above described, by adding sixty drops of the mixture to three ounces of water. Such a gargle should be used, in ordinary cases, twice a day.

Having thus fully described my invention or discovery,

What I claim, and desire to secure by Letters Patent, is—

The medical preparation hereinbefore described, and which I call vocalina, the same consisting of an alcoholic solution of the resin called jatoba, with or without the addition of the other tinctures named, or either of them, said medicine being intended for use in affections of the throat and vocal organs, as set forth.

The above specification of my said invention signed and witnessed at New York, this 12th day of July, A. D. 1869.

DR. FRANCIS FRISIANI.

Witnesses:
LOUIS ROSI,
C. WRIGHT KIRBY.